United States Patent
Mendis et al.

(10) Patent No.: US 7,195,308 B1
(45) Date of Patent: Mar. 27, 2007

(54) PILLAR STRUCTURE FOR PASSENGER VEHICLE

(75) Inventors: Kolita Mendis, Fox Point, WI (US); Benny Sommerfeld, Thousand Oaks, CA (US); Hakan Ericson, Thousand Oaks, CA (US); Dirk Koring, Gothenburg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/275,484

(22) Filed: Jan. 9, 2006

(51) Int. Cl.
*B60R 27/00* (2006.01)

(52) U.S. Cl. .............................. 296/193.06; 296/193.05

(58) Field of Classification Search ........... 296/187.01, 296/187.03, 187.12, 193.01, 193.05, 193.06, 296/203.03
See application file for complete search history.

(56) References Cited

U.S. PATENT DOCUMENTS

| | | | |
|---|---|---|---|
| 4,282,641 A * | 8/1981 | Phillips | 296/193.01 |
| 4,348,046 A | 9/1982 | Ohya | |
| 5,228,741 A * | 7/1993 | Ide | 296/203.03 |
| 5,688,021 A | 11/1997 | Tomforde et al. | |
| 6,003,898 A | 12/1999 | Teply et al. | |
| 6,332,643 B1 | 12/2001 | Sukegawa et al. | |
| 6,719,364 B2 | 4/2004 | Hoppenstein | |
| 2002/0043821 A1 * | 4/2002 | Takashina et al. | 296/203.03 |
| 2005/0029836 A1 * | 2/2005 | Caliskan et al. | 296/193.06 |

* cited by examiner

*Primary Examiner*—Lori L. Coletta
(74) *Attorney, Agent, or Firm*—Brooks Kushman P.C.

(57) ABSTRACT

A passenger vehicle is disclosed having a vehicle body with a first pillar extending upward from a lateral side of the body. A side member extends along the body and a second pillar extends upward and rearward from the side member. The second pillar has a lower end affixed to the side member between a front seating row and a rear seating row of the vehicle. An upper end of the second pillar is displaced adjacent to the rear seating row of the vehicle, and is spaced apart from the front seating row of the vehicle. The orientation of the second pillar maximizes impact strength, rear occupant ingress and egress between the pillars and a lateral range of vision for the driver.

20 Claims, 2 Drawing Sheets

PILLAR STRUCTURE FOR PASSENGER VEHICLE

BACKGROUND OF THE INVENTION

1. Field of the Invention

The invention relates to body structures for passenger vehicles, more particularly to pillar structures for passenger vehicles.

2. Background Art

Passenger vehicles have passenger compartments defined by a plurality of pillars extending from the body that converge at a roof with doors and windows oriented between adjacent pillars. The pillars are commonly named from front to rear in alphabetical order. Thus, the pillars on either side of the windshield are referred to as A-pillars. The next sequential pillars are referred to as B-pillars, which are typically located on the other side of the first set of doors.

Pillars that are oriented within the passenger compartment region typically extend from a side member to a roof frame. These pillars provide structural support to the passenger compartment from the side member to the roof frame. These passenger compartment pillars typically cooperate with an associated door.

In sedans having four-doors, a B-pillar is commonly provided relatively centrally disposed with respect to the passenger compartment. A front door and a rear door are often provided on either side of the B-pillar. The B-pillar often creates a blind spot for the driver when peering over his shoulder.

In two-door cars, the doors are generally longer than those provided in four-door cars of the same or similar model. Longer doors are required to permit ingress and egress for rear seat occupants. An enlarged spacing between pillars imposes greater demands on door structures to meet side impact requirements comparable to an equivalent four-door car.

SUMMARY OF THE INVENTION

In one non-limiting embodiment of the invention, a passenger vehicle is provided having a vehicle body, a first pillar extending upward from the vehicle body on a lateral side of the body, a side member extending rearward along the lateral side of the body and a second pillar extending upward and rearward from the side member. The second pillar is provided with a lower end affixed to the side member between a front seating row and a rear seating row of the vehicle. An upper end of the second pillar is displaced adjacent to the rear seating row of the vehicle and the upper end is spaced apart from the front seating row of the vehicle.

Another non-limiting embodiment of the invention provides a two-door passenger vehicle having a vehicle body, an A-pillar extending upward from the vehicle body on a lateral side of the vehicle body, a side member extending rearward along the lateral side of the body, and a B-pillar extending upward from the side member. The B-pillar has a lower end affixed to the side member between a front seating row and a rear seating row of the vehicle. The B-pillar has an upper end that extends rearward and is offset from a vertical orientation by at least ten degrees.

Another non-limiting embodiment of the invention provides a two-door passenger vehicle body with a passenger compartment having a front seating row and a rear seating row for seating passengers. The body includes a side member extending longitudinally along a lateral side of the passenger body proximate to a lower region of the passenger compartment. A first pillar extends upward from the lateral side of the body at a forward region of the passenger compartment. A roof frame extends rearward from the first pillar. The roof frame is spaced above the side member. A second pillar extends upward from the side member proximate to an intermediate region between the front seating row and the rear seating row. The second pillar is inclined and extends proximate to a rearward end of the roof frame. An opening is provided between the side member, the first pillar, the roof frame and the second pillar to permit ingress and egress of passengers to and from the front seating row and the rear seating row.

The above aspects, objects, embodiments, benefits and advantages of the present invention are apparent in the attached figures and in the detailed description of embodiments of the invention below.

DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
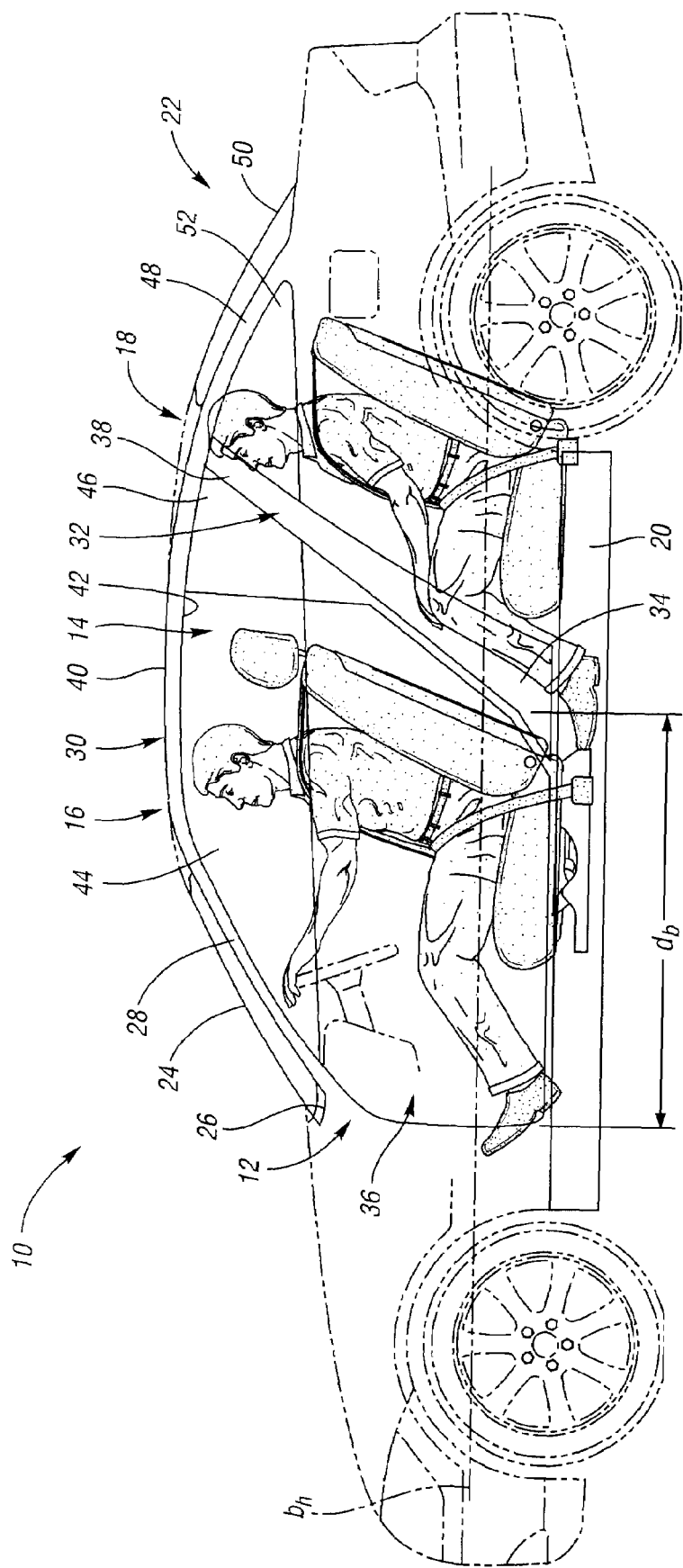
FIG. 1 is a lateral side elevation view of a passenger vehicle in accordance with the present invention, illustrated with a passenger in a front seating row and another passenger in a rear seating row.

With reference now to FIG. 1, a passenger vehicle is illustrated in accordance with the present invention and is referenced generally by numeral 10. Although the vehicle 10 is illustrated as a two-door passenger vehicle, the invention contemplates that the present invention may be employed with any passenger vehicle wherein multiple rows of seats are accessed through a common door on a lateral side of the vehicle 10.

The passenger vehicle 10 has a vehicle body 12, which provides the body structure for the vehicle. The vehicle body 12 defines a passenger compartment 14 for housing passengers within the vehicle 10. The passenger compartment 14 is provided with a front seating row 16 and a rear seating row 18 for transporting multiple rows of passengers.

The vehicle body 12 includes a side member 20 extending longitudinally along a lateral side 22 of the body 12 at a lower region of the passenger compartment 14. A forward region of the passenger compartment 14 is bounded by a windshield 24. The windshield 24 is supported by a cross-member 26 of the body 12 that extends beneath the windshield 24. The windshield 24 is supported on lateral sides thereof by a pair of A-pillars 28. The A-pillars 28 extend upward from the vehicle body 12 to a roof 30 of the vehicle 10. The A-pillars 28 may extend vertically downward to the cross-member 26 or downward to the side member 20 of the vehicle body 12.

Static center pillars of four-door vehicles provide enhanced impact strength to the vehicle in comparison to prior art static central pillars in two-door vehicles. Four-door vehicles permit a center pillar to be disposed between the front seating row 16 and the rear seating row 18. Thus, the static center pillar of prior art four-door vehicles is attached to the side member 20 between the front rear seating row 16, 18 at a bumper height. Since prior art two-door vehicles generally have long doors to permit ingress and egress of rear seat occupants, additional structure is provided, such as a pillar incorporated within the door. Such added structure adds cost and weight to the vehicle.

The vehicle body 12 of the present invention is illustrated with a B-pillar 32 that is affixed to the side member 20 between the front seating row 16 and the rear seating row 18 at bumper height, which is indicated by the horizontal line labeled $b_h$. Accordingly, the B-pillar 32 has a lower end 34 affixed to the side member 20 at an orientation that is comparable to a prior art four-door passenger vehicle. By affixing the lower end 34 of the B-pillar 32 to the side member 20 between the front seating row 16 and the rear seating row 18, the vehicle body 12 is structurally enhanced for sustaining impacts at bumper height $b_h$. Thus, a door 36 of the passenger vehicle 10 requires less structural enhancements than prior art doors for two-door vehicles. The spacing between the A-pillar 28 and the B-pillar 32 at bumper height $b_h$ is illustrated by the longitudinal dimension $d_b$ in FIG. 1. By minimizing the spacing $d_b$ at bumper height $b_h$, structural efficiency is improved over the prior art.

The B-pillar 32 is inclined as it extends rearward to permit ingress and egress to the rear seating row 18. Accordingly, the B-pillar 32 includes an upper end 38 that extends longitudinally rearward of the B-pillar lower end 34.

The body 12 may include a roof frame 40 that extends along the roof 30 from the A-pillar 28 to the B-pillar upper end 38 for supporting the roof 30 and interconnecting the A-pillar 28 and the B-pillar 32. The side member 20, A-pillar 28, roof frame 40 and B-pillar 32 collectively provide an opening 42 for ingress and egress of passengers to and from the front seating row 16 and rear seating row 18 of the passenger compartment 14. The door 36 is translatably connected to the vehicle body 12 for closing the opening 42.

Figure 2:
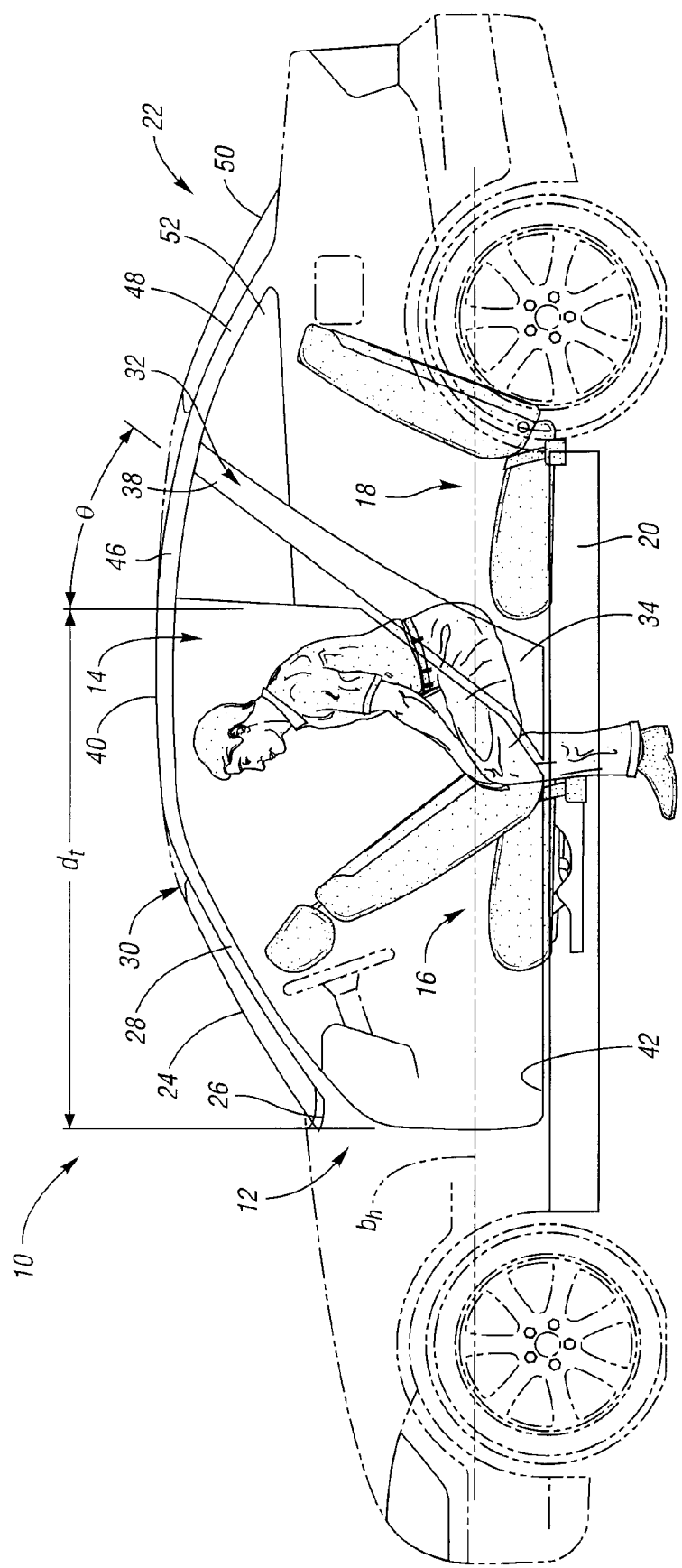
FIG. 2 is a lateral side elevation view of the passenger vehicle of FIG. 1, illustrated with a passenger during ingress or egress of the rear seating row.

With reference now to FIG. 2, a rear occupant is illustrated either entering or exiting the vehicle, with one leg extending through the opening 42 and placed upon an underlying support surface. Due to the incline of the B-pillar 32, an increased spacing between the A-pillar 28 and the B-pillar 32 is obtained at torso height. This dimension is illustrated as $d_t$ in FIG. 2. By enlarging the spacing at torso height $d_t$, ingress and egress of the vehicle is improved, thus making it easier for an occupant to access the rear seating row 18. The inclined B-pillar 32 provides a pillar spacing $d_t$ at torso height that is comparable to two-door cars of the prior art.

Accordingly, the B-pillar 32 is disposed at an angle ($\theta$ in FIG. 2) that maximizes body impact strength at bumper height (comparative to a four-door vehicle) and maximized spacing between the A-pillar 28 and the B-pillar 32 at torso height for facilitating ingress and egress to the rear seating row 18 (comparable to a two-door vehicle). The angle $\theta$ of the B-pillar 32 can be determined for the particular layout of a given vehicle based upon the design criteria for the vehicle. Angle $\theta$ of the B-pillar 32, for example, may be within a range of ten to forty-five degrees. This angle $\theta$ of the B-pillar 32, for example, is illustrated as approximately thirty-seven degrees in FIG. 2.

In design and development of a two-door vehicle that employs the pillar structure of the present invention, the spacing at torso height $d_t$ is greater than a spacing at bumper height $d_b$. The spacing at torso height $d_t$ when compared to the spacing at bumper height $d_b$ provides a ratio that is, for example, within a range of 1.1:1 to 1.5:1. The ratio of pillar spacing at torso height $d_t$, to pillar spacing at bumper height $d_b$ is approximately 1.2:1 for the exemplary B-pillar 32 illustrated in FIGS. 1 and 2.

The B-pillar 32 is also provided in a straight path without major irregularities, thereby improving the B-pillar's structural integrity and efficiency for stiffness and rollover strength.

The inclined B-pillar 32 further enhances the driver's range of lateral side vision. The door 36 is provided with a window 44. A static window 46 may be provided between the B-pillar 32 and the door window 44 thereby extending the driver's lateral range of vision.

In the exemplary vehicle body 12 illustrated, a C-pillar 48 may also be provided. The C-pillar 48 engages the roof frame 40 proximate to the B-pillar upper end 38 for additional support of the roof 30 and for lateral support of a rear window 50. Accordingly, a second static window 52 may be provided between the B-pillar 32 and the C-pillar 48 for providing side vision to a rear occupant in the rear seating row 18.

In summary, a pillar structure for a passenger vehicle 10 is provided which maximizes impact strength, enhances ease of rear occupant ingress and egress, and maximizes a driver's lateral vision range for a passenger vehicle.

While embodiments for carrying out the invention have been described in detail, those familiar with the art to which this invention relates will recognize various alternative designs and embodiments for practicing the invention as defined by the following claims.

What is claimed is:

1. A passenger vehicle comprising:
   a vehicle body;
   a first pillar extending upward from the vehicle body on a lateral side of the vehicle body;
   a side member extending along the lateral side of the body; and
   a second pillar extending upward and rearward from the side member, the second pillar having a lower end affixed to the side member between a front seating row and a rear seating row of the vehicle, and an upper end displaced adjacent to the rear seating row of the vehicle and spaced apart from the front seating row of the vehicle.

2. The passenger vehicle of claim 1 wherein the second pillar is oriented at an angle that maximizes body impact strength at bumper height and maximizes spacing between the first pillar and the second pillar at torso height for facilitating ingress and egress to the rear seating row.

3. The passenger vehicle of claim 1 wherein the second pillar is offset from vertical in a range of ten to forty-five degrees.

4. The passenger vehicle of claim 1 wherein the second pillar is offset from vertical by approximately thirty-seven degrees.

5. The passenger vehicle of claim 1 wherein the vehicle has one door on each lateral side.

6. The passenger vehicle of claim 1 further comprising a roof frame extending from the first pillar to the second pillar.

7. The passenger vehicle of claim 6 further comprising a window fixed within an acute included angle between the roof frame and the second pillar for improving side vision for a driver of the vehicle.

8. The passenger vehicle of claim 6 further comprising a third pillar extending from a rear quarter panel of the vehicle and engaging the roof frame proximate to the upper end of the second pillar.

9. A passenger vehicle comprising:
a vehicle body;
a first pillar extending upward from the vehicle body on a lateral side of the vehicle body;
a side member extending along the lateral side of the body;
a second pillar extending upward and rearward from the side member, the second pillar having a lower end affixed to the side member between a front seating row and a rear seating row of the vehicle, and an upper end displaced adjacent to the rear seating row of the vehicle and spaced apart from the front seating row of the vehicle;
a roof frame extending from the first pillar to the second pillar;
a third pillar extending from a rear quarter panel of the vehicle and engaging the roof frame proximate to the upper end of the second pillar; and
a window disposed between the second pillar and the third pillar for side viewing for a passenger seated in the rear seating row.

10. The passenger vehicle of claim 1 wherein the first pillar, the side member and the second pillar define an opening for ingress and egress of passengers to and from the front seating row and the rear seating row.

11. The passenger vehicle of claim 10 wherein a longitudinal dimension of the opening at a torso height is greater than a longitudinal dimension of the opening at a bumper height for facilitating ease of ingress and egress to the rear seating row.

12. The passenger vehicle of claim 10 wherein a ratio of a longitudinal dimension of the opening at a torso height to a longitudinal dimension of the opening at a bumper height is within a range of 1.1:1 to 1.5:1.

13. The passenger vehicle of claim 10 wherein a ratio of a longitudinal dimension of the opening at a torso height to a longitudinal dimension of the opening at a bumper height is approximately 1.2:1.

14. The passenger vehicle of claim 10 further comprising a door mounted to the body for translation relative thereto for closing the opening, the door having a window.

15. The passenger vehicle of claim 14 further comprising a roof frame extending from the first pillar to the second pillar.

16. The passenger vehicle of claim 15 further comprising a second window disposed within an included angle between the roof frame and the second pillar bounded on a forward side by the opening for improving side vision for a driver of the vehicle.

17. A passenger vehicle comprising:
a vehicle body;
a first pillar extending upward from the vehicle body on a lateral side of the vehicle body;
a side member extending along the lateral side of the body;
a second pillar extending upward and rearward from the side member, the second pillar having a lower end affixed to the side member between a front seating row and a rear seating row of the vehicle, and an upper end displaced adjacent to the rear seating row of the vehicle and spaced apart from the front seating row of the vehicle;
wherein the first pillar, the side member and the second pillar define an opening for ingress and egress of passengers to and from the front seating row and the rear seating row;
a door mounted to the body for translation relative thereto for closing the opening, the door having a window;
a roof frame extending from the first pillar to the second pillar; and
a second window disposed within an included angle between the roof frame and the second pillar bounded on a forward side by the opening for improving side vision for a driver of the vehicle;
wherein the door window and the second window collectively provide a side view for the driver.

18. A two-door passenger vehicle comprising:
a vehicle body;
an A-pillar extending upward from the vehicle body on a lateral side of the vehicle body;
a side member extending along the lateral side of the body; and
a B-pillar extending upward from the side member, the B-pillar having a lower end affixed to the side member between a front seating row and a rear seating row of the vehicle, the B-pillar having an upper end that extends rearward and is offset from a vertical orientation by at least ten degrees;
wherein the B-pillar is oriented at an angle that maximizes body impact strength at bumper height and maximizes spacing between the A-pillar and the B-pillar at torso height for facilitating ingress and egress to the rear seating row.

19. A two-door passenger vehicle body having a passenger compartment with a front seating row and a rear seating row for seating passengers, the body comprising:
a side member extending longitudinally along a lateral side of the passenger body proximate to a lower region of the passenger compartment;
a first pillar extending upward from the lateral side of the body at a forward region of the passenger compartment;
a roof frame extending rearward from the first pillar, the roof frame being spaced above the side member; and
a second pillar extending upward from the side member proximate to an intermediate region between the front seating row and the rear seating row, the second pillar being inclined and extending proximate to a rearward end of the roof frame;
wherein an opening is provided between the side member, the first pillar, the roof frame and the second pillar to permit ingress and egress of passengers to and from the front seating row and the rear seating row.

20. The two-door passenger vehicle of claim 19 further comprising:
a door mounted to the body for translation relative thereto for closing the opening, the door having a window; and
a second window disposed within an included angle between the roof frame and the second pillar bounded on a forward side by the opening for improving side vision for a driver of the vehicle;
wherein the door window and the second window collectively provide a side view for the driver.

* * * * *